United States Patent [19]

Furukawa et al.

[11] Patent Number: 4,647,057
[45] Date of Patent: Mar. 3, 1987

[54] STEERING SYSTEM FOR VEHICLES

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 658,479

[22] Filed: Oct. 9, 1984

[30] Foreign Application Priority Data

| Oct. 17, 1983 | [JP] | Japan | 58-193664 |
| Oct. 17, 1983 | [JP] | Japan | 58-193665 |
| Oct. 17, 1983 | [JP] | Japan | 58-193666 |
| Oct. 17, 1983 | [JP] | Japan | 58-193667 |

[51] Int. Cl.$^4$ ............................................. B62D 5/10
[52] U.S. Cl. .................................................... 280/91
[58] Field of Search .......................... 280/91, 96, 707; 180/140, 141, 142; 74/571 L, 831, 834, 836

[56] References Cited

U.S. PATENT DOCUMENTS

| 3,596,730 | 8/1971 | Cecce | 280/91 |
| 3,903,983 | 9/1975 | Yeske | 280/91 |
| 4,263,979 | 4/1981 | Sturgill | 280/91 |
| 4,313,514 | 2/1982 | Furukawa et al. | 280/91 |

FOREIGN PATENT DOCUMENTS

26363 2/1984 Japan .

Primary Examiner—John J. Love
Assistant Examiner—Ross Weaver
Attorney, Agent, or Firm—Irving M. Weiner; Joseph P. Carrier; Pamela S. Burt

[57] ABSTRACT

A steering system for vehicles in which the steered angle ratio of a rear wheel to a front wheel is controllable in accordance with the vehicle speed. The steering system is provided with a manual switch device for selecting to set an arbitrary one of a plurality of predetermined steered angle ratios. The steering system may be further provided with a switch lock device for locking the switch state of the manual switch device. The switch lock device may be actuated when the vehicle speed is higher than a predetermined reference vehicle speed. Further, the switch lock device may be actuated when a reduction gear is shifted to a shift position having a relatively low reduction ratio. The switch lock device may also be actuated when the steered angle of the front wheel is larger than a predetermined value.

11 Claims, 15 Drawing Figures

FIG. 9

STEERING SYSTEM FOR VEHICLES

BACKGROUND OF THE INVENTION

1. Field of the Invention

The present invention relates to a steering system for vehicles of the type in which a rear wheels is steerable in relation to the steering operation of a front wheel.

2. Description of Relevant Art

There has already been proposed a steering system for vehicles in which a rear wheel is steerable in relation to the steering of a front wheel such that the steered angle ratio of the rear wheel to the front wheel is variable in accordance with the vehicle speed. (Japanese Laid Open Application JP-A-59-26363 dated Feb. 10, 1984)

More particularly, in such proposed steering system, the rear wheel is steered, at relatively low vehicle speeds, in the opposite direction to the front wheel or substantially by zero degree and, at relatively high vehicle speeds, in the same direction as the front wheel. The steered angle ratio is given as a continuous function of the vehicle speed, as represented by a curve X shown in FIG. 7 of the accompanying drawings, such that for vehicle speeds higher relative to a predetermined vehicle speed $d_1$ the angle ratio is positive, that is, the front and rear steered angles are the same in phase, and for vehicle speeds lower relative thereto the angle ratio is negative, that is, the steered angles are opposite in phase, whereby continuous control of the steered angle ratio is achieved to be effected along the function curve X, ranging from a low speed to a high speed. As a result, at relatively low vehicle speeds, the minimum turning radius of the vehicle as well as the inside wheel span is remarkably reduced, in addition to favorable facilitation of the vehicle turning characteristics such as when parking, travelling along a narrow curved road, and making a U-turn. Moreover, at relatively high vehicle speeds, the steering responsiveness can be highly improved.

In a low speed range, however, there often occurs a case in which the handling operation is facilitated by steering a rear wheel in the same direction as a front wheel rather than steering same in the opposite direction thereto, such as when parallel parking the vehicle in a row of longitudinally parked cars or maneuvering the vehicle relative to laterally approaching neighboring objects.

With such view in mind, the present invention has been achieved to provide an improvement in a steering system for vehicles of the above-mentioned type.

SUMMARY OF THE INVENTION

According to the present invention, there is provided a steering system for vehicles including a steering wheel, a front wheel, a means for steering the front wheel, a rear wheel, a means for steering the rear wheel, a ratio changing means for changing the steered angle ratio of the rear wheel to the front wheel, a control means for controlling the ratio changing means, and a vehicle speed sensor cooperating with the control means. The steered angle ratio is controllable in accordance with the vehicle speed, and the steering system is provided with a manual switch means for selecting to set an arbitrary one of a plurality of predetermined steered angle ratios, the manual switch means being connected to the control means.

The steering system may further be provided with a switch lock means for locking the switch state of the manual switch means, the switch lock means being operatively connected to the control means.

Accordingly, an object of the present invention is to provide a steering system for vehicles, in which the steered angle ratio of a rear wheel to a front wheel is arbitrarily changeable irrespectively of the vehicle speed or the steered angle of the front wheel, only when a manual operation is generally necessary such as at very low vehicle speeds needed for handling such as when parallel parking in a row of parked cars and the like, thereby avoiding unnecessary handling operations due to such transient variations in the steered angle of the rear wheel that otherwise may appear, such as when the steered angle ratio is changed at relatively high or medium vehicle speeds, whereby the vehicle turning characteristic is remarkably improved.

The above and further features, object and advantages of the present invention will become more apparent from the following detailed description of the preferred embodiments of the invention when the same is read in conjunction with the accompanying drawings.

DETAILED DESCRIPTION OF PREFERRED EMBODIMENTS

Figure 1:
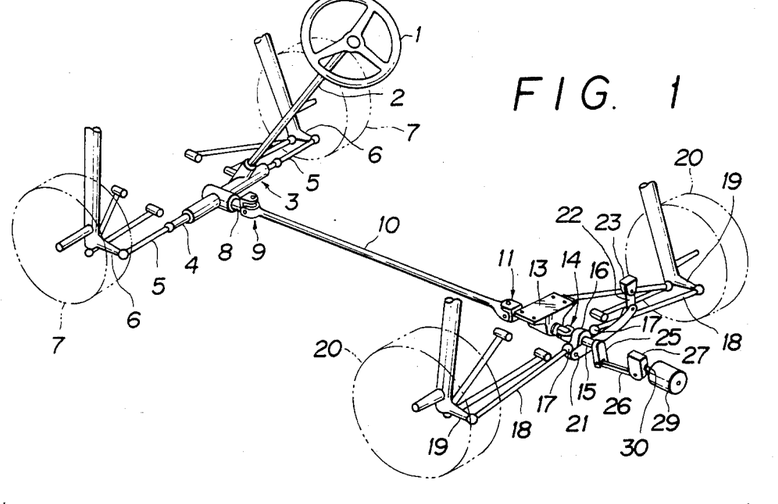
FIG. 1 is a schematic perspective view showing a basic structure of a vehicle equipped with a steering system applicable to respective embodiments of the present invention.
Figure 2:
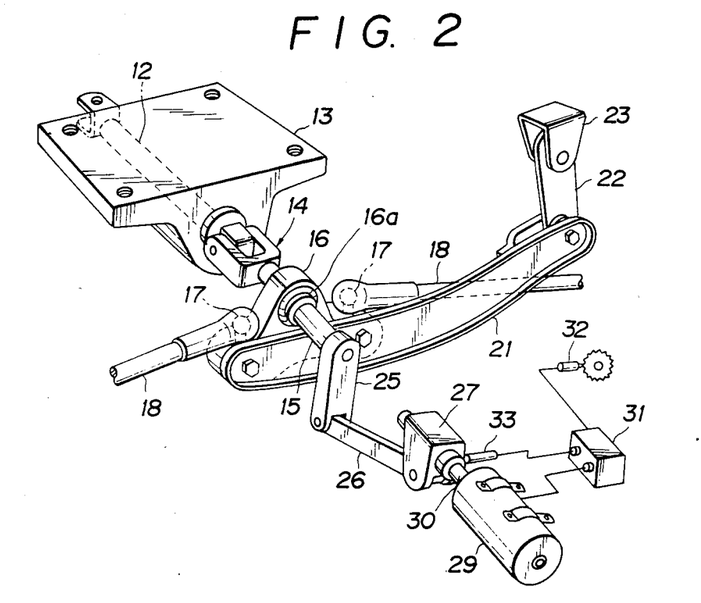
FIG. 2 is an enlarged perspective view of a rear wheel steering mechanism of the steering system of FIG. 1.

There will be described hereinbelow three partially different steering systems for vehicles each respectively according to one of three embodiments of the present invention, which include a basic mechanical system substantially equivalent to that of the known steering system described hereinabove. FIGS. 1 and 2 show the arrangement of the basic mechanical system, the description of which will be set forth hereinbelow in conjunction with FIGS 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering system is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering system, the input shaft extending along the longitudinal centerline of a vehicle body (not shown) and being rotatably supported by means of a bearing bracket 13 secured to the vehicle body. The rear end of the input shaft is connected through a swing joint 14 to a swingable shaft 15 having at the longitudinally middle part thereof a joint member 16 loosely fitted thereon. The joint member 16 is connected at each transverse end thereof through one of a pair of ball joints 17, 17 to the inner end of one of a pair of tie rods 18, 18, while being transversely and vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. To the lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the abovementioned input shaft, which is designated at reference numeral 12 in FIG. 2.

Moreover, the vehicle has mounted thereon a microcomputer 31 adapted to receive data signals from both a vehicle speed sensor 32 detecting the travelling speed of the vehicle and a slider position sensor 33 detecting the screw-fed position of the slider 27, to thereby supply a proper control signal to the motor 29 in accordance with the vehicle speed.

In the above arrangement, a mechanism for changing the steered angle ratio of the rear wheels 20, 20 to the front wheels 7, 7 is constituted with the swingable shaft 15, the joint member 16, the arm member 25, the link 26, the slider 27, the motor 29, and the output shaft 30.

Figure 3A:
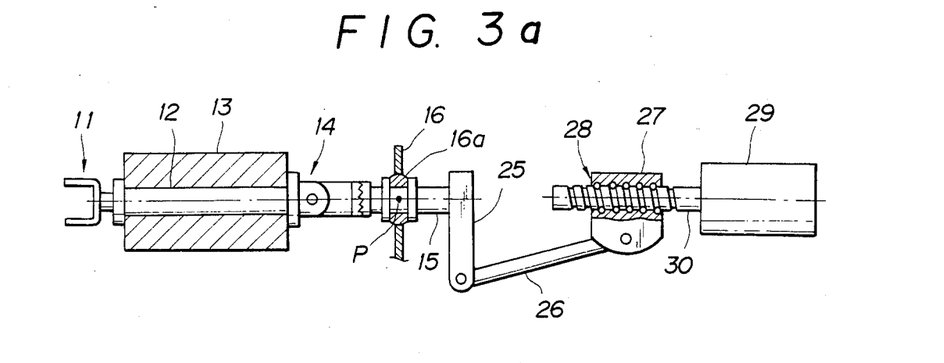
FIGS. 3a to 3c are longitudinal sectional side views, for functional explanation, of an essential part of the rear wheel steering mechanism of FIG. 2.
Figure 3B:
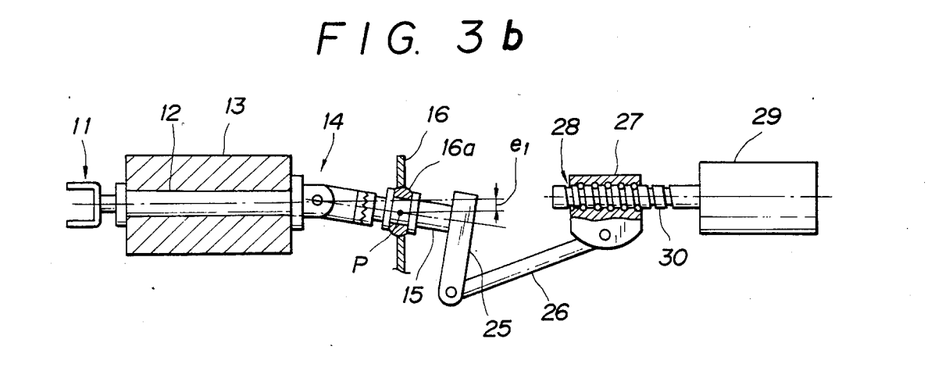
Figure 3C:
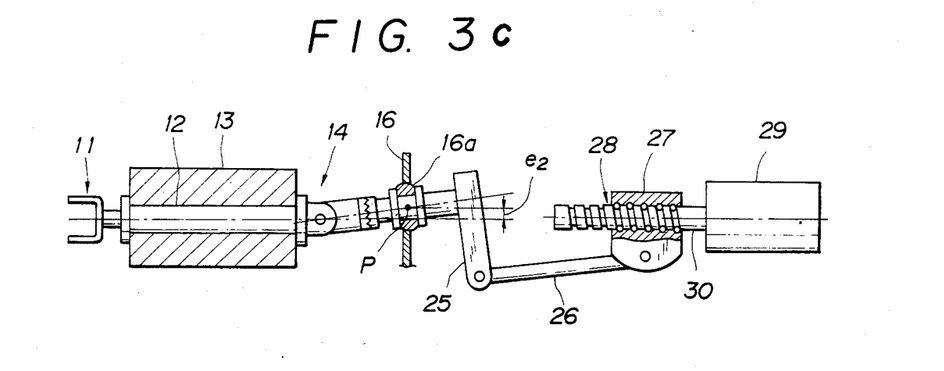

Referring now to FIGS. 3a to 3c, the functioning of the steered angle ratio changing mechanism will be described below.

When the vehicle speed is equal to a predetermined reference speed $d_2$ described later in conjunction with FIG. 7, then the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that even when the swingable shaft 15 is rotated the joint member 16 will not laterally swing, thus being kept from actuating the left and right rear tie rods 18, 18. Accordingly, when operated, the steering wheel 1 will steer only the front wheels 7, 7, leaving the rear wheels 20, 20 substantially unsteered.

On the other hand, while the vehicle speed is lower than the reference speed $d_2$, the computer 31 receiving a corresponding signal from the vehicle speed sensor 32 makes a judgment, which causes the motor 29 to be controlled with respect to the number of revolutions thereof in response to the detected vehicle speed, whereby the slider 27 is advanced as shown in FIG. 3b from the position therof in FIG. 3a. At such a low speed, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which continuously varies depending on the vehicle speed.

To the contrary, while the vehicle speed is higher than the reference speed $d_2$, the computer 31 causes the motor 29 to be reversed in accordance with the vehicle speed, so that the slider 27 is retreated as shown in FIG. 3c from the position thereof in FIG. 3a. At such a high speed, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also continuously varies depending on the vehicle speed.

In the steering system according to the first embodiment, besides the foregoing basic mechanical system, there is employed a manual select switch device for controlling the steered angle ratio changing mechanism.

Figures 4, 5, 7:
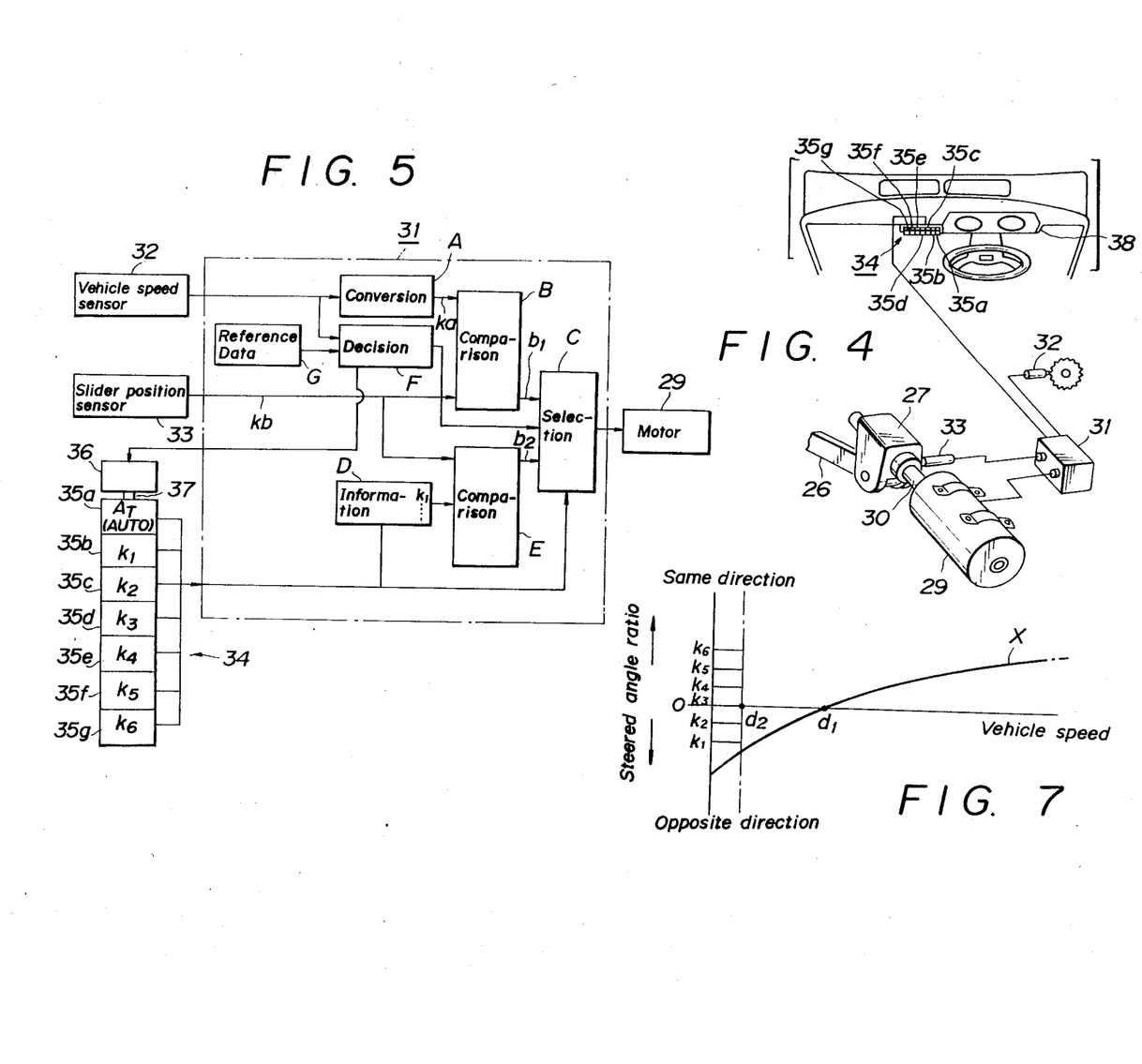
FIG. 4 is a constitutional view of an essential part of a control part of a steering system for vehicles according to a first embodiment of the invention.
FIG. 5 is a block diagram of the control part of FIG. 4.
FIG. 7 is a graph showing a characteristic curve of the steered angle ratio in the first embodiment shown in FIGS. 4 to 6.

With reference to FIG. 4, designated at reference numeral 34 is the manual select switch device, which comprises a plurality of pushbutton switches 35i (where "i" is an arbitrary element in a set of alphabetically ordered suffixes "a" to "g") aligned on an instrument panel 38 in a passenger room of the vehicle to facilitate their manual operation by a driver of the vehicle, one of the pushbutton switches 35*i* being adapted to be in an "on" position thereof in an exclusive manner over the others. Namely, when pushed, any given one of them is in its "on" state, leaving or resetting the others in or to their "off" state. The select switch device 34 is connected to the computer 31, which thus has input therein a signal representing the result of such manual selection of steered angle ratio at the select switch device 34.

The computer 31 comprises an ordinary micro-computer system including, but not limited to, a plurality of integrated circuits (not shown) such as a CPU, a ROM, a RAM, and a plurality of peripheral interfaces.

As seen from FIG. 4, the computer 31 and the select switch device 34 constitute, together with the motor 29 and the sensors 32, 33, a control part of the steering system.

Referring now to FIG. 5, which is a block diagram of the control part of FIG. 4, the select switch device 34 further comprises a control solenoid 36 connected to the computer 31, an actuation rod 37 put under control of the solenoid 36, and a plurality of lock pins (not shown) each provided respectively for one of the pushbutton switches 35*i* and adapted such that, when the actuation rod 37 is actuated by the solenoid 36, they lock respective switch states of those pushbutton switches 35*i* which are put in their "off" positions at the time of such actuation. Under a later-described locking condition, a lock command is given from the computer 31 to the solenoid 36, to thereby lock the switch state of the switches 35*i* in their "off" positions. The control motor 29 is driven by the computer 31 to rotate the output shaft 30 in a later-described manner.

The above-mentioned control part, which is adapted to alternatively function in an automatic control mode having a proper steered angle ratio determined by the computer 31 or in a manual control mode having a desirous steered angle ratio manually selected by the select switch device 34, will be described below with respect to the angle ratio control function with reference to FIG. 5.

The automatic mode in which the steered angle ratio automatically varies in response to the vehicle speed as illustratively represented by the curve X of FIG. 7 is selectable by pushing a first one 35*a* of the pushbutton switches 35*i*. In the computer 31, as described above, a vehicle speed signal from the vehicle speed sensor 32 is input to be converted by a conversion A into a steered angle ratio information signal ka corresponding to the vehicle speed and, from the slider position sensor 33, another steered angle ratio information signal kb representing the actual position of the slider 27 is obtained, whereas these steered angle ratio information signals ka, kb are subjected to a comparison B, to thereby obtain an information signal b1 for the necessary correction of the steered angle ratio. Then, through undergoing a selection C, the correction information signal b1 is supplied as it is from the computer 31 to the control motor 29 in the automatic mode.

The computer 31 has stored therein information D on a set of predetermined steered angle ratios, the information D comprising a plurality of corresponding pieces ki of steered angle ratio information (where "i" is an arbitrary element in a set of suffix numbers 1 to 6; see FIG. 7). When, at the select switch device 34, an arbitrary one (for example a second one 35*b*) of pushbutton switches 35*i* other than the first one 35*a* is pushed, then the control part is put in the manual mode and there is read from the information D a corresponding one (a first one $k_1$) of the pieces ki of steered angle ratio information, which in turn is subjected to a comparison E with the steered angle ratio information signal kb from the slider position sensor 33, thereby obtaining a correction information signal $b_2$. Then, through the selection C as it is in the manual mode, the correction information signal $b_2$ is output to the control motor 29, whereby the steered angle ratio of the steering system is kept equal to the corresponding one (first one $k_1$) of the pieces ki of information. Also, when any different one (for example a third or fourth one 35*c* or 35*d*) of the pushbutton switches 35*i* other than the automatic mode pushbutton switch 35*a* is pushed, a corresponding similar effect will be caused, so that the driver is permitted to manually select and set an arbitary one of the predetermined steered angle ratios ki of FIG. 7.

Incidentally, the computer 31 is adapted to make a decision F with respect to the vehicle speed signal from the vehicle speed sensor 32, which decision F comprises a judgment to be performed, depending on a comparison of the detected vehicle speed with a predetermined vehicle speed $d_2$ (see FIG. 7) stored in the form of reference data G, about whether or not the detected vehicle speed is larger than the reference vehicle speed. When the former is larger, that is, the actual vehicle speed is in excess of the predetermined speed $d_2$, then the solenoid 36 is energized, thus having actuated the rod 37, thereby locking respective switch states of those pushbutton switches 35*i* which are then put in their "off" positions. In such locked state, none of the pushbutton switches 35*i* is operable, even when trying to manually change the steered angle ratio at the select switch device 34. To the contrary, when the vehicle speed is lower than the predetermined speed $d_2$, the solenoid 36 is deenergized, thus having released respective pushbutton switches 35*i* from their locked states, so that an arbitrary one of the steered angle ratios ki is selectable at the select switch device 34.

The reference vehicle speed $d_2$ is determined to be as very low as may be given by considering a vehicle speed range necessary such as when parallel parking the vehicle in a row of longitudinally parked cars or moving sidewardly close to a stationary object.

The respective foregoing processes of the computer 31 are exercised by following a control program stored in the ROM as a memory of the micro-computer system.

Figure 6:
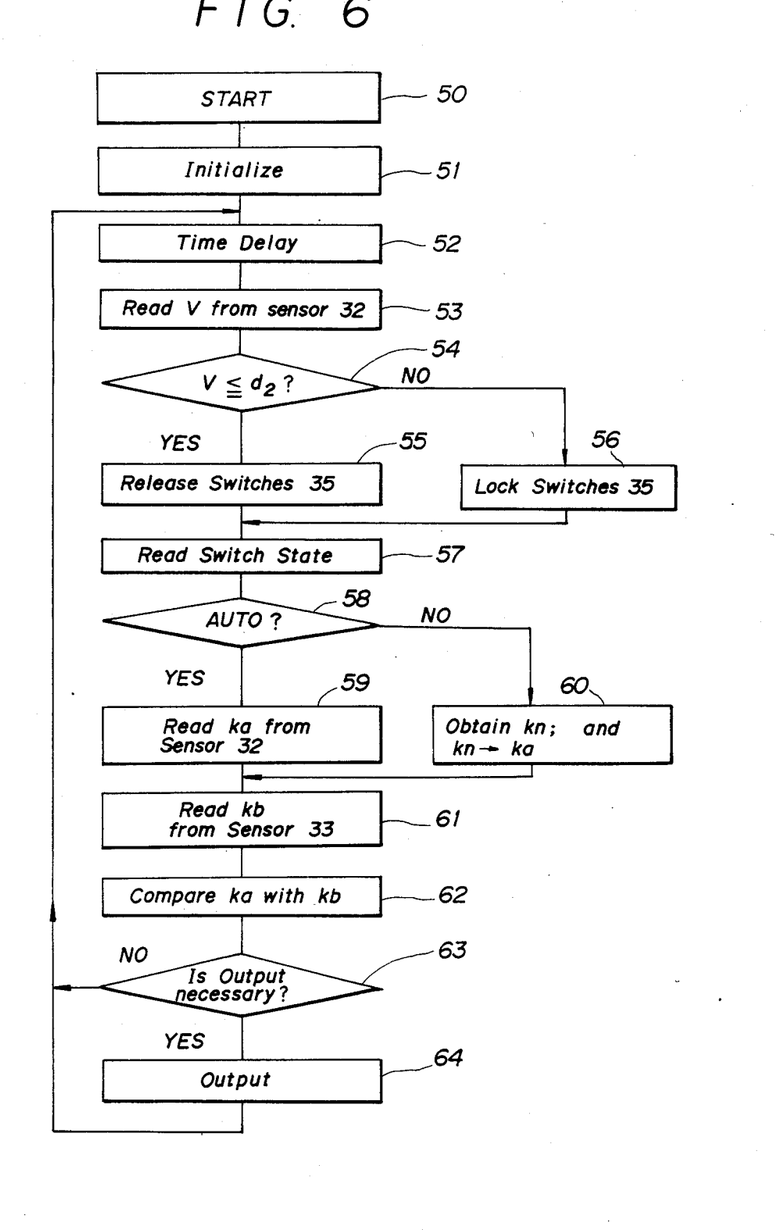
FIG. 6 is a schematic flowchart of a program of a micro-computer system of the control part of FIGS. 4 and 5.

FIG. 6 is a rough flowchart showing the control program.

As seen from FIG. 6, the control program starts at a stage 50 when the control part of the steering system is powered on or reset, and goes to an initializing stage 51 for initializing peripheral devices to set necessary variables.

Then, the program flow enters a base loop comprising a pluraltiy of stages 52 to 64.

At the first stage 52 of the base loop, a time period of about one second is consumed, before the flow enters a subsequent stage 53 where a vehicle speed V is read from the vehicle speed sensor 32. At a decision stage 54 next thereto, the comparison of the vehicle speed V with the reference vehicle speed $d_2$ is performed. When the vehicle speed V is larger than the reference speed $d_2$, the solenoid 36 is enerziged at a stage 56 to lock the pushbutton switches 35*i*, whereas, to the contrary, when the vehicle speed V is not larger than the reference speed $d_2$, the solenoid 36 is deenergized at another stage 55 to release the switches 35*i* from their locked states. Such processes of these two stages 55, 56 are programmed to be independent of whether or not the solenoid 36 has been excited till then.

At a stage 57, a state of the select switch device 34 is read, to thereby judge in a decision stage 58 next to the stage 57 as to whether the pushbutton switch 35a is pushed on to select the automatic control mode. When the switch 35a is judged to be on, the vehicle speed V is read from the vehicle speed sensor 32 at a subsequent stage 59 to obtain from the curve X of FIG. 7 a steered angle ratio ka to be stored in a corresponding memory. On the the hand, when one of other pushbutton switches 35i other than the switch 35a is pushed on, a corresponding one of the steered angle ratios ki is read from the ROM and stored in the memory of the steered angle ka at a stage 60, whereby the ratio ka in this memory is thus substituted by the ratio ki read from the ROM. In both of the foregoing two cases, the program flow proceeds to a stage 61, where an actual steered angle ratio kb represented in terms of the position of the slider 27 is read from the slider position sensor 33. Then, at a stage 62, this steered angle ratio kb is compared with the stored ratio ka, to make a judgement at a stage 63 about whether or not an output is necessary to the control motor 29. Namely, there is judged whether or not the actual steered angle ratio kb is equal to the ratio kb obtained as a result of the program process.

When the output is judged necessary at the stage 63, a drive signal is output at the last stage 64 of the base loop to the control motor 29, to feed the slider 27 into a proper position, thereby the actual steered angle ratio to be ka.

In the case where such output is judged unnecessary at the stage 63, as well as in the case where the process at the stage 64 is finished, the program flow again goes to the first stage 52 of the base loop.

In the foregoing program flow, an alarm means such as a buzzer may be favorably operated when the pushbutton switches 35i, as they have been in their released state, are to be locked at the stage 55. Moreover, such alarm means for giving such alarm may be favorably provided with a manual switch for manually selecting the use thereof.

In the foregoing embodiment of the invention, there is employed a vehicle-oriented micro-computer system. In this respect, there may be employed an electrical network or a mechanical arrangement having a similar function.

Further, the present invention may be embodied in specific forms other than the above embodiment, such as a steering system including front and rear wheels having hydraulically controlled steering in which information on the steered angle of the front wheels is hydraulically transmitted, or a steering system in which the steered angle of the front wheels is directly informed to a computer by means of an electric signal.

As will be understood from the foregoing description, in a steering system according to the first embodiment of the invention, the steered angle ratio of rear wheels to front wheels, while automatically controllable in accordance with the vehicle speed, is manually selectable from among a plurality of arbitrarity predetermined values by a manual select means, whereby in a low speed range a favorable facilitation is achieved such as of the handling when parallel parking in a row of longitudinally parked cars or for a lateral approach to a neighboring object, thus resulting in a remarkable improvement in the vehicle turning characteristic.

Particularly, such manual selection is permitted only when generally needed, that is, at very low speeds necessary such as for parallel parking or for a lateral approach, thus favorably preventing unnecessary handling operations due to transient variations of the rear wheels' steered angle which otherwise may appear when the steered angle ratio is changed at a relatively high or medium vehicle speed.

There will be described hereinbelow a steering system for vehicles according to the second embodiment of the invention with reference to FIGS. 8 to 10, in which for the convience of comprehension like parts are designated by like reference characters in relation to the first embodiment of the invention.

Figure 8:
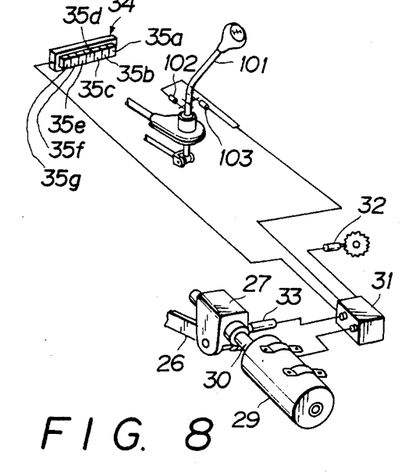
FIG. 8 is a constitutional view of an essential part of a control part of a steering system for vehicles according to a second embodiment of the invention.
Figure 9:
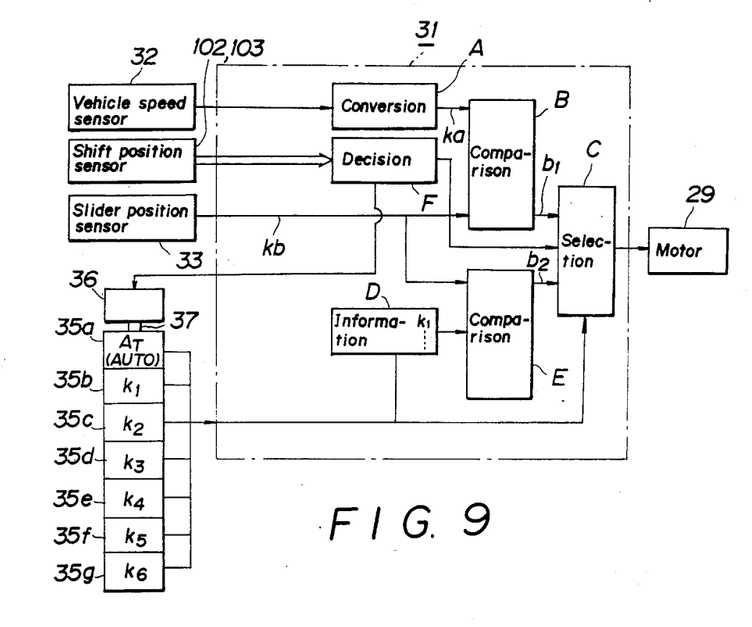
FIG. 9 is a block diagram of the control part of FIG. 8.

In FIG. 8, which shows the arrangement of an essential part of a control part of the steering system according to the second embodiment, designated at reference numeral 101 is a speed shift lever. In the vicinity of the lower part of the shift lever 101, there are provided a pair of shift position sensors 102, 103 for detecting that the shift lever 101 is in a "low" speed position thereof and a "reverse" position thereof, respectively. The shift position sensors 102, 103 are connected to a computer 31. Each shift position to be detected may be one of those to be used at very low speeds. Moreover, each shift position sensor may detect the gear position of a gear train having a relatively large reduction gear ratio, in consideration of a very low speed to be needed such as when parallel parking the vehicle in a row of longitudinally parked cars or laterally approaching a neighboring object. Further, each sensor may be of any type, for example an optical sensor or a mechanical switch directly operable by shifting the shift lever 101.

The control part in the second embodiment will be described below with respect to the angle ratio control function of the computer 31 with reference to FIG. 9, whereas this control part is similar in most respects to that of the first embodiment shown in FIG. 5 and hence only the difference therebetween will be described in detail.

In the second embodiment, in place of the reference data G, there is made a decision F based on respective input signals from the shift position sensors 102, 103. When neither the sensor 102 nor 103 has a detection signal output therefrom, a solenoid 36 is energized, thus having acutuated a rod 37, thereby locking respective switch states of those pushbutton switches 35i which are then put in their "off" positions, whereas, to the contrary, when a detection signal from either the sensor 102 or 103 is found, that is, the lever 101 is shifted to the "low" speed or "reverse" position, then the solenoid 36 is deenergized, thus permitting the steered angle ratio to be manually changed by a select switch device 34.

The above and further processes of the computer 31 are exercised by following a control program stored in a ROM as a memory of the computer 31. The flow of this control program is substantially similar to that of the first embodiment shown in FIG. 6, subject to a difference described in detail below. In other words, in the second embodiment, there are employed a plurality of stages 153 to 157 shown in FIG. 10 in place of the stages 53 to 57 of FIG. 6.

Figure 10:
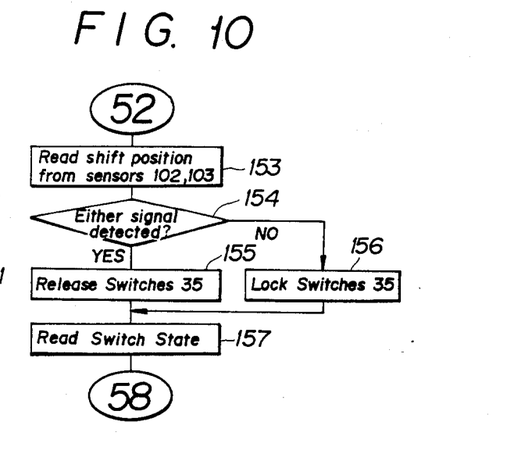
FIG. 10 is a schematic flowchart of an essential part of a program of a micro-computer system of the control part of FIGS 8 and 9.

With reference to FIG. 10, at the first stage 153, the shift position sensors 102, 103 are interrogated to have their detection state read. When, at a decision stage 154, a detection signal from either the sensor 102 or 103 is judged to be found, the solenoid 36 is deenergized at a stage 155 to release pushbutton switches 35i from their locked states. In the case where no detection signal from the sensor 102 or 103 is found, the solenoid 36 is enerziged at a stage 156 to lock the switches 35i. Then, at the last stage 157, the select switch device 34 has the switch state thereof read. Those processes following the stage 157 in the second embodiment are similar to corresponding ones of the first embodiment.

Also, in the second embodiment, respective processes at the stages 155, 156 are programmed to be independent of whether or not the solenoid 36 has been excited till then.

As will be understood from the foregoing description, in the second embodiment, in which a shift lever is made use of for the detection of a vehicle speed in a low speed range, a detection mechanism for detecting a signal demanding that a manual select switch device be locked can be constituted independently of a control system for setting the steered angle ratio of rear wheels to front wheels, so that the entire steering system is successfully kept from becoming complicated, while maintaining high reliability.

Incidentally, in the second embodiment, there may be additionally provided a shift position sensor for detecting a true "neutral" position of a shift lever in order to make use of the detection signal similarly to the case of the sensors 102, 103.

There will be described hereinbelow a steering system for vehicles according to the third embodiment of the invention with reference to FIGS. 11 to 13, in which for the convenience of comprehension like parts are designated by like reference characters in relation to the first and second embodiments of the invention.

Figures 11, 12, 13:
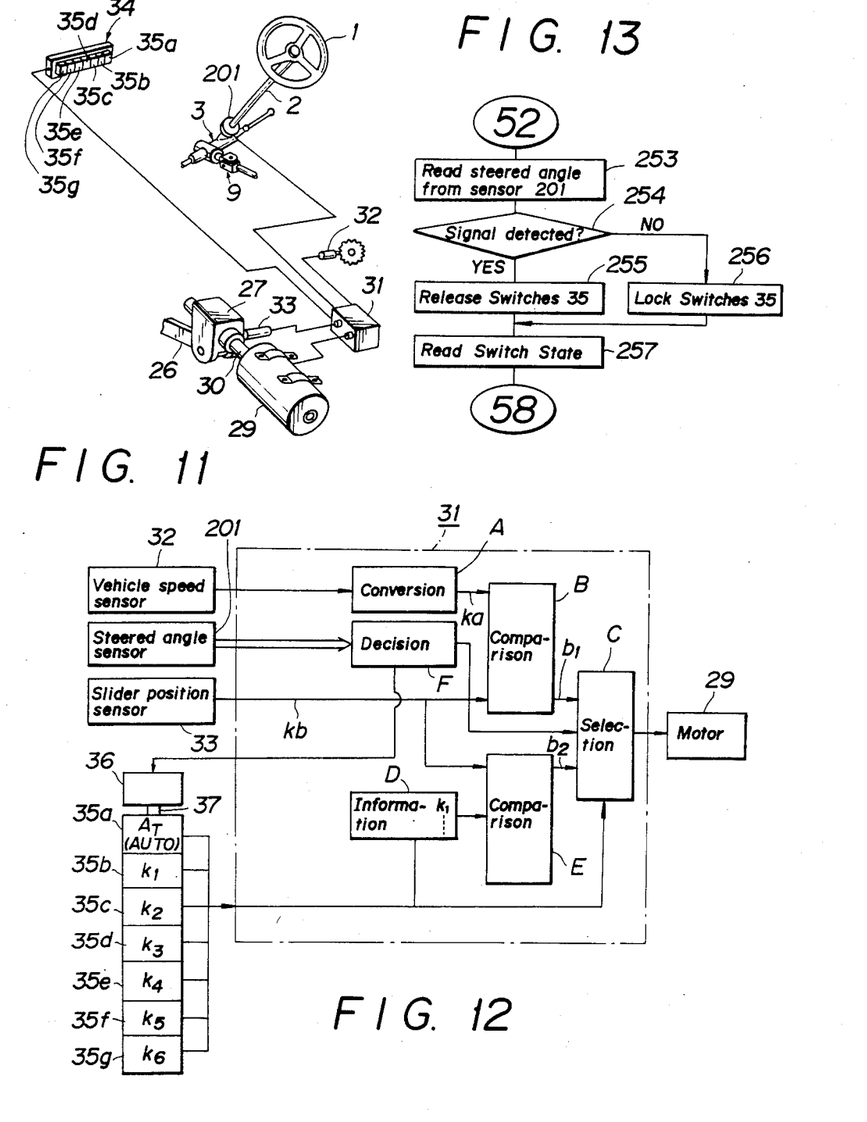
FIG. 11 is a constitutional view of an essential part of a control part of a steering system for vehicles according to a third embodiment of the invention.
FIG. 12 is a block diagram of the control part of FIG. 12.
FIG. 13 is a schematic flowchart of an essential part of a program of a micro-computer system of the control part of FIGS. 11 and 12.

In FIG. 11, which shows the arrangement of an essential part of a control part of the steering system according to the third embodiment, designated at reference numeral 201 is a steered angle sensor provided on the lower part of the steering shaft 2 to detect the steered angle of the front wheels 7, 7. The steered angle sensor 201 comprises a limit switch (not shown) operable with the rotation of the steering shaft 2 and adapted to be closed within a predetermined rotation angle range. The rotation angle range to be detected is so determined that the driver is kept free from unnecessary handling operations due to transient variations of steered angle which otherwise may appear when an automatic mode in which the steered angle ratio is automatically controlled is changed to a manual mode in which it is manually controlled. In a preferred example, such angle range may be within 0 to 30 degrees. The steered angle sensor 201 is connected to a computer 31. The control part in the third embodiment will be described below with respect to the angle ratio control function of the computer 31 with reference to FIG. 12, whereas this control part is similar in the main to that of the first embodiment shown in FIG. 5 and hence only the difference therebetween will be described in detail.

In the third embodiment, in place of the reference data G of FIG. 5, there is made a decision F based on an input signal from the steered angle sensor 201. When the existence of a detection signal from the sensor 201 is detected, i.e., when the steered angle of the front wheels 7, 7 is smaller than a predetermined value, then a solenoid 36 is deenergized, thus permitting the steered angle ratio to be manually changed by a select switch device 34. To the contrary, in the case where no detection signal from the sensor 201 is found, that is, where the steered angle of the front wheels 7, 7 is larger than the predetermined value, the solenoid 36 is energized, thus having actuated a rod 37, thereby locking respective switch states of those pushbutton switches 35i which are then put in their "off" positions.

The above and further processes of the computer 31 are exercised by following a control program stored in a ROM as a memory of the computer 31. Also the flow of this control program is substantially similar to that of the first embodiment shown in FIG. 6, subject to a difference described in detail below. In other words, in the third embodiment, there are employed a plurality of stages 253 to 257 shown in FIG. 13 in place of the stages 53 to 57 of FIG. 6.

With reference to FIG. 13, at the first stage 253, the steered angle sensor 201 is interrogated to have its detection state read. When, at a decision stage 254, a detection signal from the sensor 201 is judged to be found, that is, when the steered angle of the front wheels 7, 7 is judged there to be lower than the predetermined value, then the solenoid 36 is deenergized at a stage 255 to release pushbutton switches 35i from their locked states. In the case where no detection signal from the sensor 201 is found, that is, where the steered angle of the front wheels 7, 7 is larger than the predetermined value, the solenoid 36 is energized at a stage 256 to lock the switches 35i. Then, at the last stage 257, the select switch device 34 has its switch state read. Those processes following the stage 257 in the third embodiment are similar to corresponding ones of the first embodiment.

Also in this third emboment, respective processes at the stages 255, 256 are programmed to be independent of whether or not the solenoid 36 has been excited till then.

As will be understood from the foregoing description, in the third embodiment, in which the manual operation of a select switch device is permitted only when the steered angle of the front wheels is larger than a predetermined value, such transient variations of steered angle that otherwise may appear when the control mode is changed to be manual is effectively preventable, without unnecessary handling operations, so that the vehicle turning characteristic can be favorably improved.

Further, it will be easily understood that all the foregoing embodiments are also applicable to a vehicle with an automatic transmission.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

Particularly, although there are provided the control solenoid 36 and actuation rod 37 as a switch lock means in the three embodiments described above, it is possible that the selecting function of the select switch device 34 can be restricted under a predetermined condition by the computer 31 itself without provision of such switch lock means. Namely, for example, concerning the third embodiment described above, the steered angle ratio changing mechanism may be controlled in accordance with the automatic mode by the computer 31 irrespectively of the switch state of the select switch device 34, when the steered angle of the front wheel is larger than a predetermined value.

We claim:

1. A steering system for vehicles including a steering wheel, a front wheel, means for steering said front wheel, a rear wheel, means for steering said rear wheel, ratio changing means for changing the steered angle ratio of said rear wheel to said front wheel, control means for controlling said ratio changing means, and a vehicle speed sensor cooperating with said control means, in which the steered angle ratio is controllable in accordance with the vehicle speed, wherein said steering system is provided with a manual switch means for selecting to set an arbitrary one of a plurality of predetermined steered angle ratios, said manual switch means being connected to said control means, and said control means being adapted to selectively override said manual switch means in response to the sensed vehicle speeds.

2. A steering system according to claim 1, wherein said manual switch means comprises at least a pair of switches each respectively adapted to exclusively take an "on" state, including one adapted to select an automatic mode in which said ratio changing means is controlled by said control means such that, at relatively low vehicle speeds, said rear wheel is steered in the opposite direction to said front wheel or substantially by zero degree and, at relatively high speeds, said rear wheel is steered in the same direction as said front wheel.

3. A steering system according to claim 2, wherein said steering system is further provided with switch lock means for locking the switch state of said manual switch means, said switch lock means being operatively connected to said control means, and wherein, when the vehicle speed is higher than a predetermined reference vehicle speed, said switch lock means is actuated by said control means to lock the switch state of said manual switch means.

4. A steering system according to claim 2, wherein said steering system is further provided with switch lock means for locking the switch state of said manual switch, said switch lock means being operatively connected to said control means, and wherein, when said reduction gear is shifted to a shift position having a relatively low reduction ratio, said switch lock means is actuated by said control means to lock the switch state of said manual switch means.

5. A steering system according to claim 4, wherein said shift position of relatively low reduction ratio excludes a "low" speed position of said reduction gear and a "reverse" position thereof.

6. A steering system according to claim 2, wherein said steering system is further provided with switch lock means for locking the switch state of said manual switch, said switch lock means being operatively connected to said control means, and wherein, when the steered angle of said front wheel is larger than a predetermined value, said switch lock means is actuated by said control means to lock the switch state of said manual switch means.

7. A steering system according to claim 2, wherein said ratio changing means is controlled in accordance with said automatic mode by said control means irrespectively of the switch state of said manual switch means when the vehicle speed is higher than a predetermined reference vehicle speed.

8. A steering system according to claim 2, wherein when said reduction gear is shifted to a shift position having a relatively low reduction ratio, said ratio changing means is controlled in accordance with said automatic mode by said control means irrespectively of the switch state of said manual switch means.

9. A steering system according to claim 1, wherein when the steered angle of said front wheel is larger than a predetermined value, said ratio changing means is controlled in accordance with said automatic mode by said control means irrespectively of the switch state of said manual switch means.

10. A steering system for vehicles including a steering wheel, a front wheel, means for steering said front wheel, a rear wheel, means for steering said rear wheel, ratio changing means for changing the steered angle ratio of said rear wheel to said front wheel, control means for controlling said ratio changing means, means for detecting the shift position of a reduction gear of the vehicle, said shift position detecting means being operatively connected to said control means, and a vehicle speed sensor cooperating with said control means, in which the steered angle ratio is controllable in accordance with the vehicle speed, wherein said steering system is provided with manual switch means for selecting to set an arbitrary one of a plurality of predetermined steered angle ratios, said manual switch means being connected to said control means, and said control means being adapted to selectively override said manual switch means in response to the detected shift positions.

11. A steering system for vehicles including a steering wheel, a front wheel, means for steering said front wheel, a rear wheel, means for steering said rear wheel, ratio changing means for changing the steered angle ratio of said rear wheel to said front wheel, control means for controlling said ratio changing means, means for detecting the steered angle of said front wheel, said steered angle detecting means being operatively connected to said control means and a vehicle speed sensor for cooperating with said control means, in which the steered angle ratio is controllable in accordance with the vehicle speed, wherein said steering system is provided with manual switch means for selecting to set an arbitrary one of a plurality of predetermined steered angle ratios, said manual switch means being connected to said control means, and said control means being adapted to selectively override said manual switch means in response to the detected steered angles.

* * * * *